(12) United States Patent
Lee

(10) Patent No.: US 6,874,165 B2
(45) Date of Patent: Apr. 5, 2005

(54) MODIFIED NBR GLOVES

(76) Inventor: Mao-Sheng Lee, 11 Fl., No. 201, Nanking East Road, Sec. 3, Taipei (TW)

( * ) Notice: Subject to any disclaimer, the term of this patent is extended or adjusted under 35 U.S.C. 154(b) by 136 days.

(21) Appl. No.: 10/442,890

(22) Filed: May 19, 2003

(65) Prior Publication Data

US 2004/0231027 A1 Nov. 25, 2004

(51) Int. Cl.$^7$ .............................................. A41D 14/00
(52) U.S. Cl. ............................... 2/168; 2/159; 2/161.6; 2/161.7; 2/161.8; 2/167; 428/378; 428/423.1
(58) Field of Search ...................... 2/159, 161.6–161.8, 2/167, 168; 428/423.1, 378

(56) References Cited

U.S. PATENT DOCUMENTS

| | | | | |
|---|---|---|---|---|
| 4,507,413 A | * | 3/1985 | Thoma et al. | 524/42 |
| 4,762,750 A | * | 8/1988 | Girgis et al. | 428/378 |
| 5,070,540 A | * | 12/1991 | Bettcher et al. | 2/2.5 |
| 5,883,155 A | * | 3/1999 | Hoerner et al. | 523/122 |
| 6,000,061 A | * | 12/1999 | Taneja et al. | 2/168 |
| 6,365,278 B1 | * | 4/2002 | Hoerner et al. | 428/423.1 |
| 6,369,154 B1 | * | 4/2002 | Suddaby | 524/560 |
| 6,372,333 B1 | * | 4/2002 | Sugiyama et al. | 428/311.71 |
| 6,723,350 B2 | * | 4/2004 | Burrell et al. | 424/618 |
| 6,759,473 B1 | * | 7/2004 | Nakamura et al. | 524/503 |

* cited by examiner

*Primary Examiner*—John J. Calvert
*Assistant Examiner*—Robert H. Muromoto, Jr.

(57) ABSTRACT

A glove formed by a formulation of nitrile butadiene rubber latex material added therein with a thickening agent of carboxymethyl cellulose in latex material for making a NBR glove having a tensile strength of 18~30 Mpa (2,611~4,351 psi) as measured according to ASTM D-412 on a sample of nitrile butadiene rubber having a thickness ranging from 0.12~0.15 mm (4.72~5.91 mils) and having a relaxation property of less than 50% of an initial stress at six minutes, thereby providing a NBR glove having improved abrasion resistance and good donning property.

3 Claims, No Drawings

MODIFIED NBR GLOVES

BACKGROUND OF THE INVENTION

A series of conventional gloves made of synthetic materials including nitrile butadiene rubber (NBR), polyvinyl chloride (PVC), polyurethane (PU), polyethylene (PE), polychloroprene (CR), etc. had been used to substitute natural rubber latex gloves. The NBR glove is the most popular one among those conventional synthetic gloves.

U.S. Pat. No. 5,014,362 and Reissue U.S. Pat. No. Re. 35,616 invented by Tillotson et al. disclosed a glove comprising elastomeric material of nitrile butadiene rubber, characterized by: being substantially impermeable to water vapor and liquid water, and having a tensile strength of at least about 1500 psi as measured according to ASTM D-412 on a sample of the elastomeric material having a thickness of about 4.0 to 4.5 mils. Reviewing the specification of Tillotson's U.S. Pat. No. Re. 35,616, Table 2, the thickness of 4.5 mils (0.1143 mm) corresponds to a tensile strength of 2200 psi (according to ASTM D412). There is no disclosure in Tillotson's prior art about the relationship between the glove thickness and the abrasion or wear resistance of the glove.

Conventional methods to increase the abrasion resistance of the gloves, especially for medical or surgical uses, include: the adhesion of fibrous material to a thin-layer sheet material of the glove; the lamination of plural protective layers; or modification of glove formulation to increase the thickness for resisting abrasion or wear. However, the conventional methods to increase the glove thickness may result in reduction of its tensile strength or may affect the donning property when wearing the glove during use or in contact with poisonous, dangerous pollutants or contaminants in a hospital.

The present inventor has found these phenomena and invented the present modified NBR glove with increased thickness but without reducing its tensile strength.

SUMMARY OF THE INVENTION

The object of the present invention is to provide a glove formed by a formulation of nitrile butadiene rubber latex material added therein with a thickening agent of carboxymethyl cellulose in latex material for making a NBR glove having a tensile strength of 18~30 Mpa (2,611~4,351 psi) as measured according to ASTM D-412 on a sample of nitrile butadiene rubber having a thickness ranging from 0.12~0.15 mm (4.72~5.91 mils) and having a relaxation property of less than 50% of an initial stress at six minutes, thereby providing a NBR glove having improved abrasion resistance and good donning property.

DETAILED DESCRIPTION

A formulation of latex mixture as set forth in Table 1 is prepared in accordance with the present invention. A thickening agent is added into the formulation. The thickening agent is preferably selected from carboxymethyl cellulose (CMC) in the present invention.

TABLE 1

| | Formulation of Latex material: | |
|---|---|---|
| a. | NBR: | 100 Parts |
| b. | Zinc oxide: | 1.9 PHR |
| c. | Accelerating agent: | 1.7 PHR |
| d. | Surfur: | 0.59 PHR |

TABLE 1-continued

| | Formulation of Latex material: | |
|---|---|---|
| e. | Antioxidant: | 0.45 PHR |
| f. | Potassium hydroxide: | 0.3 PHR |
| g. | Pigment: | 0.189 PHR |
| h. | CMC: | 2 PHR |

The glove of the present invention is preferably made with the following procedures:
1. Dipping a glove form in the latex mixture (the formulation as shown in Table 1);
2. Curing the latex mixture on the glove form at suitable curing temperature (e.g. 300° F.);
3. Stripping the cured latex glove from the glove form to obtain the NBR glove having a thickness and other physical properties as shown in Table 2.

TABLE 2

| Physical properties (Testing standards) | |
|---|---|
| Tensile strength: | 18~30 Mpa (ASTM-D412) |
| Elongation: | 550~680% (ASTM-D412) |
| Palm thickness (mm): | 0.120~0.135 (ASTM-D3767) |
| Finger-tip thickness (mm): | 0.135~0.150 (ASTM-D3767) |

As shown in Table 2, the thickness of the glove in accordance with the present invention ranges from 0.12~0.15 mm (4.72~5.91 mils) which is thicker than the thickness of Tillotson's prior art (4.0~4.5 mils; or 0.1016~0.1143 mm).

However, the tensile strength of the glove of the present invention reaches 18~30 Mpa (2611~4351 psi), which is greater than the minimum pressure of 1500 psi and the testing pressure of 2200 psi as shown in Table 2 of Tillotson's U.S. Pat. No. Re. 35,616.

The tensile strength (18–30 Mpa) and elongation (550~680%) as shown by the present invention are meeting the ASTM requirements of medical gloves (ASTM D412-92).

When subjected to abrasion resistance test by rubbing the glove specimens of the present invention on an abrasion apparatus, the average weight loss of the test specimens of the present invention after being rubbed is very small. Meanwhile, the reduction of tensile strength of the glove specimens after being rubbed is also very small. Therefore, a good abrasion resistance of the NBR gloves can be effected by the present invention.

Since the stronger tensile strength and better thickness of the present invention, the NBR gloves as made by the present invention may prolong their service life, being more durable for medical operation and other hospital tasks to prevent the users from being injured by any sharp medical tools, poisonous, dangerous pollutants or contaminants and therefore be superior to the prior art of Tillotson's patent.

The relaxation property at six minutes of the NBR glove of the present invention is not higher than 50% of the initial stress or pressure so that the glove can be worn comfortably, not too loose or not too tight.

The present invention may be modified without departing from the spirit and scope of the present invention.

I claim:

1. A modified glove comprising nitrile butadiene rubber impermeable to water and water vapor and formed by incorporating a thickening agent into a nitrile butadiene rubber latex mixture to produce a NBR glove having a palm thickness ranging from 0.120~0.135 mm and a finger-tip thickness ranging from 0.135~0.150 mm as measured according to ASTM D3767; having a tensile strength of 18~30 Mpa as measured according to ASTM D-412; and having a relaxation property (at six minutes) of less than 50% of an initial stress of the glove.

2. A glove according to claim 1, wherein said thickening agent is a carboxymethyl cellulose.

3. A modified glove comprising nitrile butadiene rubber impermeable to water and water vapor and formed by incorporating carboxymethyl cellulose into a nitrile butadiene rubber latex mixture to produce a NBR glove having a palm thickness ranging from 0.120~0.135 mm and a finger-tip thickness ranging from 0.135~0.150 mm as measured according to ASTM D3767; having a tensile strength of 18~30 Mpa as measured according to ASTM D-412; and having a relaxation property (at six minutes) of less than 50% of an initial stress of the glove.

* * * * *